US012800763B2

(12) United States Patent
Takariki et al.

(10) Patent No.: US 12,800,763 B2
(45) Date of Patent: Nov. 17, 2026

(54) UNDERWATER DETECTION DEVICE AND TRANSMISSION CONDITION OPTIMIZATION METHOD

(71) Applicant: FURUNO ELECTRIC CO., LTD., Hyogo (JP)

(72) Inventors: Keita Takariki, Nishinomiya (JP); Daisuke Nishikubo, Takarazuka (JP); Kimiko Tanaka, Kawanishi (JP)

(73) Assignee: FURUNO ELECTRIC CO., LTD., Hyogo (JP)

( * ) Notice: Subject to any disclaimer, the term of this patent is extended or adjusted under 35 U.S.C. 154(b) by 62 days.

(21) Appl. No.: 19/018,447

(22) Filed: Jan. 13, 2025

(65) Prior Publication Data

US 2025/0147178 A1 May 8, 2025

Related U.S. Application Data

(63) Continuation of application No. PCT/JP2023/021893, filed on Jun. 13, 2023.

(30) Foreign Application Priority Data

Jul. 14, 2022 (JP) ................................ 2022-112902

(51) Int. Cl.
*G01S 15/96* (2006.01)
*G01S 7/62* (2006.01)
*G01S 15/89* (2006.01)

(52) U.S. Cl.
CPC ................ *G01S 15/96* (2013.01); *G01S 7/62* (2013.01); *G01S 15/89* (2013.01)

(58) Field of Classification Search
CPC . G01S 15/96; G01S 7/62; G01S 15/89; G01S 7/52004; G01S 7/524; H04R 1/44
See application file for complete search history.

(56) References Cited

U.S. PATENT DOCUMENTS 4,453,238 A 6/1984 Van Buren
4,905,208 A * 2/1990 Dick ...................... G01S 7/524 367/101

(Continued)

FOREIGN PATENT DOCUMENTS

JP S52-124175 A 10/1977
JP H03-015880 A 1/1991

(Continued)

OTHER PUBLICATIONS

International Search Report issued in PCT/JP2023/021893; mailed Aug. 1, 2023.

*Primary Examiner* — Ryan W Sherwin
(74) *Attorney, Agent, or Firm* — Studebaker Brackett PLLC

(57) ABSTRACT

An underwater detection device capable of simply and accurately optimizing a transmission condition of an ultrasonic oscillator included in a transducer is provided. The underwater detection device includes processing circuitry. The processing circuitry is configured to supply a transmission voltage and a transmission current to the ultrasonic oscillator, measure the transmission voltage, measure the transmission current, and optimize the transmission condition of the ultrasonic oscillator based on the measured transmission voltage and the measured transmission current.

13 Claims, 13 Drawing Sheets

(56) References Cited

U.S. PATENT DOCUMENTS

| | | | | |
|---|---|---|---|---|
| 2001/0026499 | A1* | 10/2001 | Inouchi | G01S 15/96 367/111 |
| 2007/0223312 | A1* | 9/2007 | Bartoli | G01F 23/284 367/98 |
| 2010/0097891 | A1* | 4/2010 | Cummings | G01S 7/52004 367/88 |
| 2014/0160892 | A1* | 6/2014 | Lee | G01S 7/524 367/87 |
| 2015/0157007 | A1* | 6/2015 | Boericke, II | G01S 7/52004 367/139 |

FOREIGN PATENT DOCUMENTS

| | | | |
|---|---|---|---|
| JP | 2001-212514 | A | 8/2001 |
| JP | 2004-093271 | A | 3/2004 |
| JP | 2015-059783 | A | 3/2015 |
| JP | 2019-514260 | A | 5/2019 |
| JP | 6616781 | B2 | 12/2019 |

* cited by examiner

UNDERWATER DETECTION DEVICE AND TRANSMISSION CONDITION OPTIMIZATION METHOD

CROSS-REFERENCE TO RELATED APPLICATION(S)

This application is a continuation application of PCT International Application No. PCT/JP2023/021893, which was filed on Jun. 13, 2023, and which claims priority to Japanese Patent Application No. JP2022-112902 filed on Jul. 14, 2022, the entire disclosures of each of which are herein incorporated by reference for all purposes.

TECHNICAL FIELD

The present invention relates to an underwater detection device for detecting underwater conditions and a transmission condition optimization method for automatically optimizing transmission conditions of an ultrasonic oscillator for transmitting ultrasonic waves to underwater.

BACKGROUND

An underwater detection device for detecting underwater conditions is known. In the underwater detection device, an ultrasonic wave is transmitted into the water and its reflected wave is received. Echo data corresponding to the intensity of the received reflected wave is generated, and an echo image is displayed based on the generated echo data.

In this type of underwater detection device, a new control device may be connected to the existing transducer. In the new control device, it is necessary to set transmission conditions of an ultrasonic oscillator contained in the transducer. In this case, impedance characteristics of the ultrasonic oscillator in the transducer attached to a bottom of a ship must be separately checked by a measuring instrument. Such work is rather complicated.

This problem may be solved by having the information about the ultrasonic oscillator stored in the transducer in advance. For example, information about the characteristics of the ultrasonic oscillator such as resonance frequency, allowable input power, transmission/reception sensitivity, and impedance of the ultrasonic oscillator is stored in a memory of the transducer. When the transducer is connected to a new control device, the above information is read from the memory of the transducer. Thus, the impedance characteristics of the ultrasonic oscillator may be obtained without separately measuring with a measuring instrument.

SUMMARY

A first aspect of the present invention relates to an underwater detection device. The underwater detection device, according to this aspect, includes processing circuitry configured to supply a transmission voltage and a transmission current to an ultrasonic oscillator, measure the transmission voltage, measure the transmission current, and optimize transmission condition of the ultrasonic oscillator based on the measured transmission voltage and the measured transmission current.

According to the underwater detection device, according to this aspect, since the transmission voltage and the transmission current of the ultrasonic oscillator included in the transducer may be measured by the processing circuitry, the transmission condition of the ultrasonic oscillator may be optimized based on the measurement results. Moreover, even if there are individual differences in the transducer, the actual transmission voltage and the transmission current of the ultrasonic oscillator included in the transducer may be measured, so that the optimum transmission condition for the ultrasonic oscillator may be set in the underwater detection device. Furthermore, even if the underwater environment such as the underwater temperature changes, the transmission voltage and the transmission current of the ultrasonic oscillator may be measured under the environment, so that the optimum transmission condition according to the underwater environment may be set in the underwater detection device. Therefore, the transmission condition of the ultrasonic oscillator may be easily and accurately optimized.

The second aspect of the present invention relates to a transmission condition optimization method for automatically optimizing the transmission condition of the ultrasonic oscillator for transmitting ultrasonic waves to the water. The transmission condition optimization method, according to this aspect, measures the transmission voltage and the transmission current supplied to the ultrasonic oscillator during actual use, and optimizes the transmission condition of the ultrasonic oscillator based on the measured transmission voltage and the measured transmission current.

According to the transmission condition optimization method, according to this aspect, the same effect as the first aspect may be achieved.

A third aspect of the present invention relates to a non-transitory computer-readable medium having stored thereon computer-executable instructions which, when executed by a computer, cause the computer to measure a transmission voltage and a transmission current supplied to an ultrasonic oscillator during actual use, and optimize a transmission condition of the ultrasonic oscillator based on the measured transmission voltage and the measured transmission current.

According to the program, according to this aspect, the same effect as the first aspect may be achieved.

DETAILED DESCRIPTION

Embodiments of the present invention will be described below with reference to the drawings. In the following embodiment, a fish finder is shown as an example of an underwater detection device.

Figure 1:
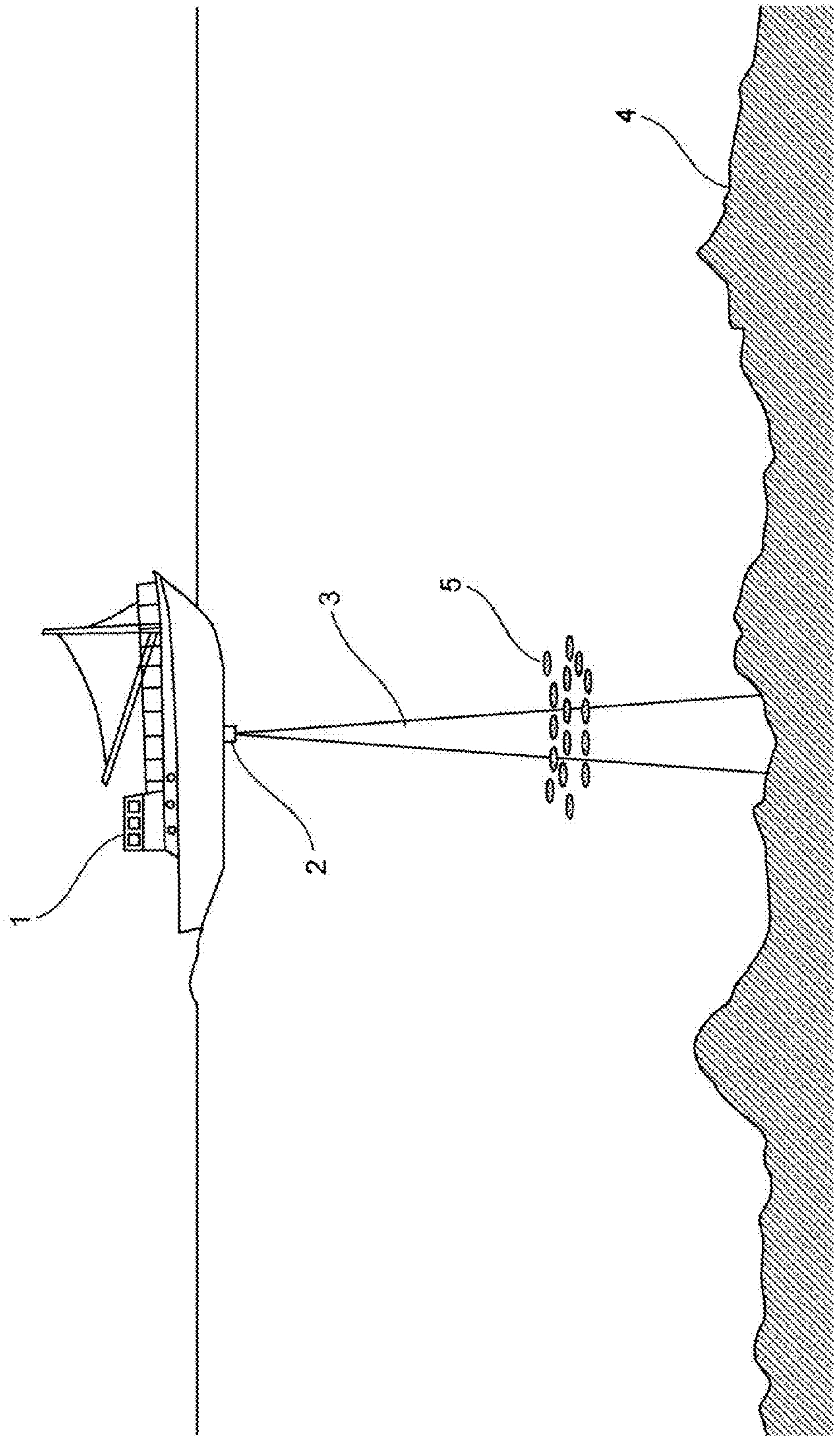
FIG. 1 is a diagram showing the use of a fish finder, according to an embodiment of the present invention.

FIG. 1 is a diagram showing the use of the fish finder, according to an embodiment of the present invention.

In this embodiment, a transducer 2 is installed at a bottom of a ship 1, and a transmission beam 3 (ultrasonic wave) is transmitted from the transducer 2 into the water. The transmission beam 3 has a cone shape with a small apex angle, and is transmitted in a pulse-like manner in the direction directly under. The transmission beam 3 is reflected by the bottom 4 and a fish group 5, and a reflected wave (echo) is received by the transducer 2. The reception signal of the reflected wave based on the transmission of one transmission beam 3 generates echo data in which the signal intensity (echo intensity) of the reception signal is distributed in the detection range in the depth direction.

By accumulating the echo data for a predetermined time, an echo image showing the distribution of the signal intensity (echo intensity) in the depth direction is generated. The echo image includes the intensity distribution of the echo from each target. The generated underwater echo image is displayed on a display unit 107 (which is also referred to as display circuit) installed in a wheelhouse or the like of the ship 1. Thus, the user may confirm the target (bottom 4, fish group 5, etc.) existing in the water.

Figure 2:
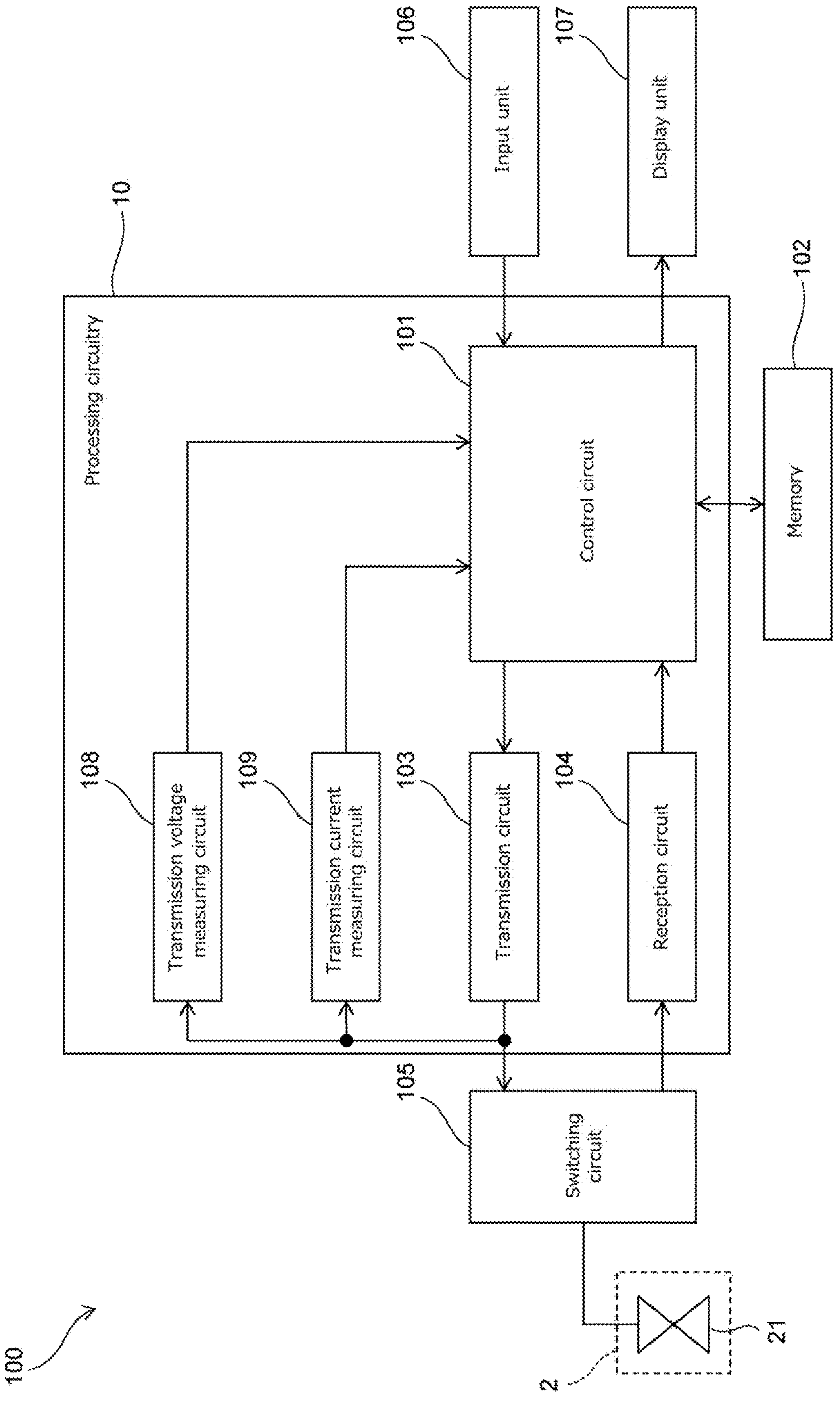
FIG. 2 is a block diagram showing the configuration of a fish finder, according to an embodiment of the present invention.

FIG. 2 is a block diagram showing the configuration of the fish finder 100, according to an embodiment of the present invention.

The fish finder 100 includes processing circuitry 10, a memory 102, a switching circuit 105, an input unit 106 (which is also referred to as input circuit), the display circuit 107, and a transducer 2 shown in FIG. 1. The processing circuitry 10 includes a control circuit 101, a transmission circuit 103, a reception circuit 104, a transmission voltage measuring circuit 108, and a transmission current measuring circuit 109.

The control circuit 101, the memory 102, the transmission circuit 103, the reception circuit 104, the switching circuit 105, the input circuit 106, the display circuit 107, the transmission voltage measuring circuit 108, and the transmission current measuring circuit 109 are installed in the wheelhouse or the like of the ship 1. The configuration except the transducer 2 may be unitized in one housing, or some components such as the display circuit 107 may be made separate. The switching circuit 105 is communicably connected to the transducer 2 by a signal cable.

The transducer 2 includes a transmitting element used for transmitting ultrasonic waves and a receiving element used for receiving ultrasonic waves. In this embodiment, the transmitting element and the receiving element of the transducer 2 comprise one ultrasonic oscillator 21.

The transmission circuit 103 generates a transmission signal for driving the ultrasonic oscillator 21 from a control signal input from the control circuit 101, and outputs the generated transmission signal to the ultrasonic oscillator 21 of the transducer 2 via the switching circuit 105.

More specifically, the control circuit 101 outputs a frequency control signal having a rectangular amplitude at a predetermined control frequency and a voltage control signal defining a control voltage to the transmission circuit 103 as the above-described control signal. The transmission circuit 103 generates a transmission signal having a frequency similar to the control frequency of the input frequency control signal and a transmission voltage similar to the control voltage of the input voltage control signal. The transmission circuit 103 outputs the generated transmission signal to the ultrasonic oscillator 21 via the switching circuit 105.

The ultrasonic oscillator 21 transmits an ultrasonic wave (transmission beam 3) into water based on the input transmission signal. The ultrasonic oscillator 21 receives the reflected wave of the transmitted ultrasonic wave and outputs a reception signal having a size corresponding to the intensity of the reflected wave to the reception circuit 104 via the switching circuit 105. The switching circuit 105 switches the transmission and reception of the signal to and from the ultrasonic oscillator 21.

The reception circuit 104 includes a filter for extracting the frequency component of transmission from the reception signal from the ultrasonic oscillator 21 and an amplification circuit for amplifying the reception signal. The reception circuit 104 generates echo data showing the echo intensity for each depth based on the reception signal of the frequency component extracted by the filter. Specifically, the reception circuit 104 generates echo data in which the elapsed time from the timing of transmitting the ultrasonic wave (transmission beam 3) is correlated with the intensity of the reflected wave, and outputs the generated echo data to the control circuit 101.

Here, the elapsed time from the timing of transmitting the ultrasonic wave corresponds to the depth. The intensity of the reflected wave decreases as the depth increases. Therefore, the reception circuit 104 corrects the intensity of the reflected wave which is attenuated according to the elapsed time, and outputs the echo data corrected for the intensity to the control circuit 101.

The control circuit 101 is composed of an arithmetic processing circuit such as a CPU and an integrated circuit such as an FPGA. The memory 102 is composed of a ROM, a RAM, a hard disk and the like. Various programs are stored in the memory 102. These programs include a function for generating an image by processing echo data and a program for causing the control circuit 101 (computer) to execute a function for optimizing the transmission conditions of the ultrasonic oscillator 21.

The memory 102 is also used as a work area in the processing of the control circuit 101. The control circuit 101 controls each part by a program stored in the memory 102. The processing for optimizing the transmission condition of the ultrasonic oscillator 21 will be described later with reference to FIGS. 3 to 6.

The input circuit 106 is composed of input means such as a mouse or a keyboard, and receives input from a user. The input circuit 106 may be a touch panel integrated with the display circuit 107. The display circuit 107 is composed of a display device such as a CRT monitor or a liquid crystal panel, and displays an image generated by the control circuit 101. As described above, the display circuit 107 displays an echo image generated based on the echo data.

The control circuit 101 acquires echo data in which the depth and the echo intensity are made to correspond, in each transmission timing of the ultrasonic wave (transmission beam 3). The control circuit 101 generates an echo image based on the continuously acquired echo data for one frame and displays it on the display circuit 107. The echo image is sometimes called an echo diagram.

The echo image is an image in which the echo intensity is distributed in a coordinate region with depth and time as two axes. In the echo image, each pixel is colored or shaded in a gradation corresponding to the signal intensity of the reflected wave. A user such as a fisherman may grasp the position and range of the fish group 5 in the water by referring to the echo image displayed on the display circuit 107.

The transmission voltage measuring circuit 108 measures the transmission voltage supplied from the transmission circuit 103 to the ultrasonic oscillator 21. The transmission current measuring circuit 109 measures the transmission current supplied from the transmission circuit 103 to the ultrasonic oscillator 21. The configuration of the transmission voltage measuring circuit 108 and the transmission current measuring circuit 109 is similar to that of the transmission voltage measuring circuit and the transmission current measuring circuit used for measuring the transmission voltage and the transmission current of a power supply circuit or the like. The transmission voltage measuring circuit 108 and the transmission current measuring circuit 109 adjust the parameters (resistance value, etc.) of each element so as to match the magnitude of the transmission voltage and the transmission current that may be assumed to be supplied to the ultrasonic oscillator 21.

In this embodiment, a process for optimizing the transmission condition of the ultrasonic oscillator 21 is executed based on the transmission voltage and the transmission current measured by the transmission voltage measuring circuit 108 and the transmission current measuring circuit 109.

Figure 3:
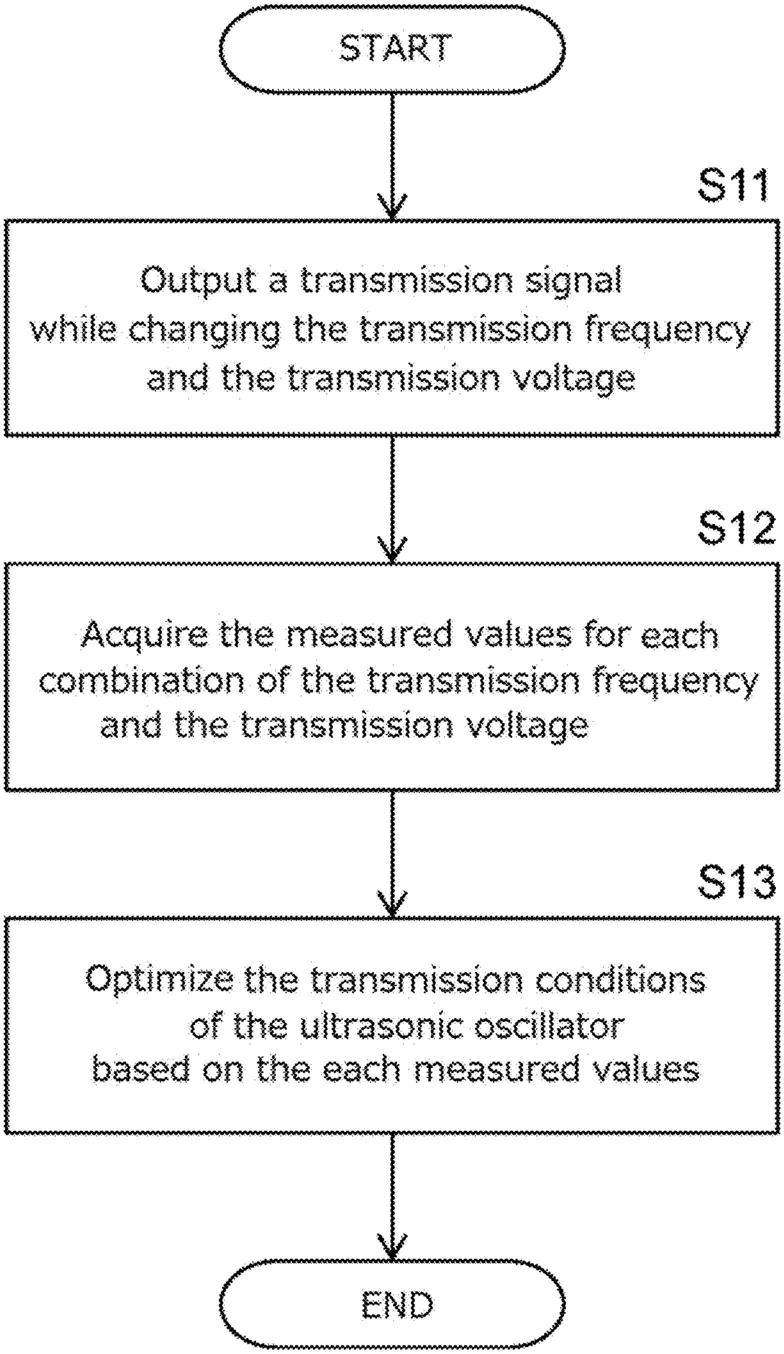
FIG. 3 is a flowchart showing a basic process for optimizing transmission conditions of an ultrasonic oscillator, according to an embodiment of the present invention.

FIG. 3 is a flowchart showing a basic process for optimizing the transmission condition of the ultrasonic oscillator 21, according to an embodiment of the present invention.

The process shown in FIG. 3 is executed, for example, immediately after the start of the fish finder 100, when the operation is interrupted, or by an arbitrary instruction from the user. When this process is executed by instruction from the user, generation of echo data and update of echo image are interrupted during this process.

First, the control circuit 101 outputs a control signal to the transmission circuit 103 while changing the control frequency and the control voltage. Thus, the control circuit 101 causes the transmission circuit 103 to output a transmission signal while changing the transmission frequency and the transmission voltage S11.

In response, the transmission voltage measuring circuit 108 and the transmission current measuring circuit 109 output the measured values of the transmission voltage and the transmission current to the control circuit 101. The control circuit 101 acquires the measured values for each combination of the transmission frequency (control frequency) and the transmission voltage (control voltage) S12. The control circuit 101 then optimizes the transmission conditions of the ultrasonic oscillator 21 based on the measured values of the transmission voltage and the transmission current S13.

The optimization of the transmission condition includes the optimization of the transmission frequency and the transmission voltage. The specific processing of the transmission frequency optimization and transmission voltage optimization will be described below.

In the following processing, the range of frequencies usable for transmission (hereinafter referred to as "nominal band"), the initial value of the transmission voltage, the upper limit of the transmission current, and the upper limit of the transmission power are used to optimize the transmission conditions.

Here, the initial value of the transmission voltage may be, for example, the minimum value in the range of the transmission voltage in which the transducer 2 (ultrasonic oscillator 21) may properly operate in transmission (i.e., proper operating range). The initial value of the transmission voltage may be another voltage value in the proper operating range. Further, the upper limit of the transmission current may be the rated value of the transmission current specified by the hardware constraints of the transmission system including the transmission circuit 103, and the upper limit of the transmission power may be the rated power of the ultrasonic oscillator 21. The upper limit of the transmission current may be set slightly lower than the rated value, and the upper limit of the transmission power may be set slightly lower than the rated value.

These values are input by the serviceman through the input circuit 106, for example, when the fish finder 100 is installed (including when the configuration other than the transducer 2 is replaced). In this case, the serviceman inputs values corresponding to the target transducer 2 and the fish finder 100 by referring to, for example, a correspondence table in which these values correspond to the type of the transducer 2 and the type of the fish finder 100 in advance. The upper limit value of the transmission current (the rated current of the transmission system) may be stored in the memory 102 in advance.

Figure 4:
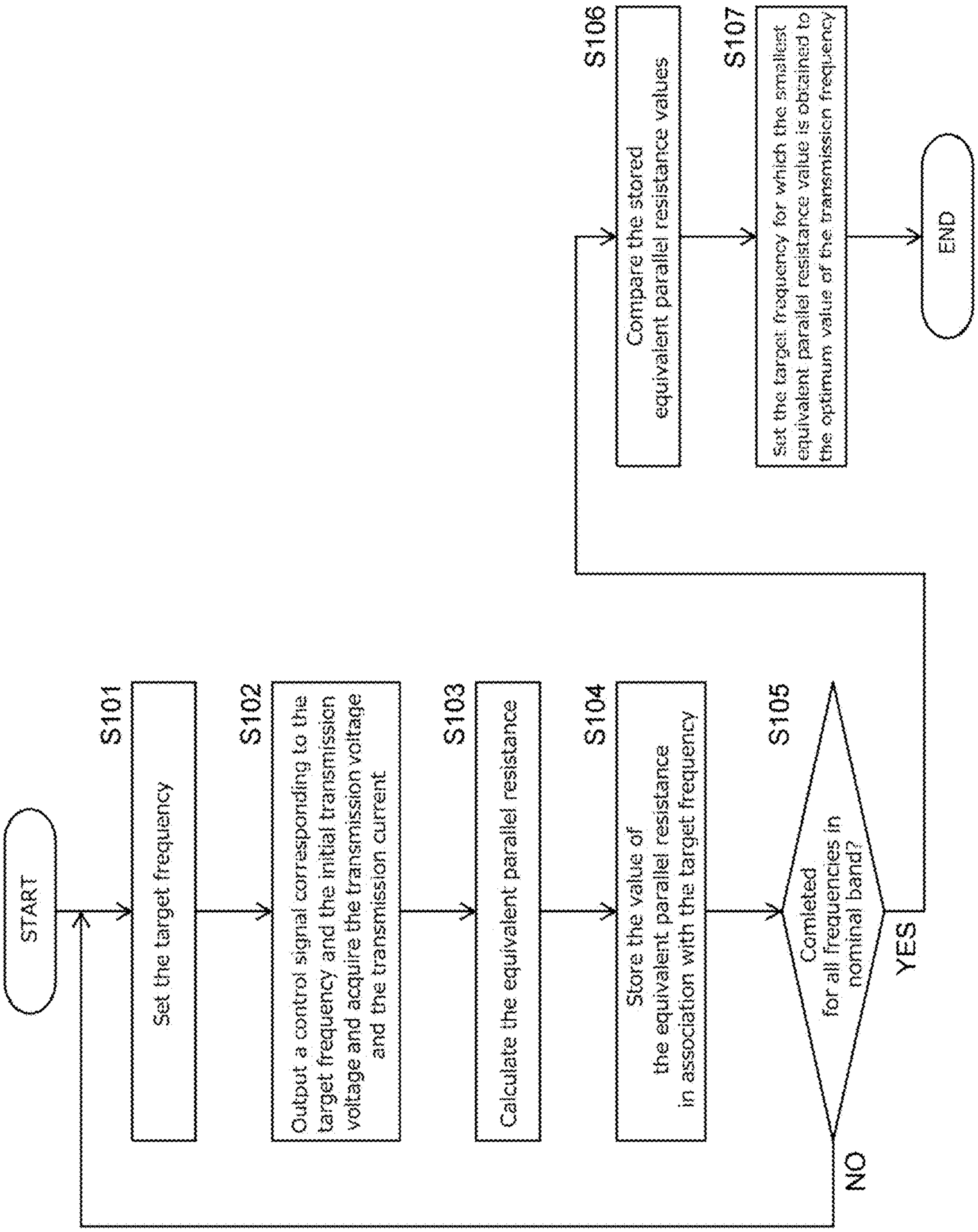
FIG. 4 is a flowchart showing a process for optimizing transmission frequencies, according to an embodiment of the present invention.

FIG. 4 is a flowchart showing a process for optimizing transmission frequencies, according to an embodiment of the present invention.

The control circuit 101 sets the target frequency to a predetermined frequency within the nominal band S101. The control circuit 101 outputs a control signal corresponding to the set target frequency and the initial transmission voltage to the transmission circuit 103, and acquires the measured value of the transmission voltage and the measured value of the transmission current from the transmission voltage measuring circuit 108 and the transmission current measuring circuit 109, S102. The control circuit 101 calculates the equivalent parallel resistance from the measured value of the transmission voltage and the measured value of the transmission current S103.

In step S103, the control circuit 101 calculates the impedance (Z) of the ultrasonic oscillator 21 from the measured value of the transmission voltage Vm and the measured value of the transmission current Im according to the following equation (1):

$$Z = Vm/\mathrm{Im} \tag{1}$$

Further, the control circuit 101 obtains the phase θ between the control voltage and the transmission voltage, and calculates the value of the equivalent parallel resistance Rp from the obtained phase θ and the impedance Z according to the following equation:

$$Rp = Z/\cos\theta \quad (2)$$

The control circuit 101 stores the calculated value of the equivalent parallel resistance Rp in the memory 102 in association with the target frequency set in step S101 (S104). The control circuit 101 determines whether the processing of steps S101 to S104 has been completed for all the frequencies set at predetermined frequency intervals in the nominal band S105. If the determination in step S105 is NO, the control circuit 101 sets the next frequency in the nominal band as the target frequency in step S101, and similarly executes the processing of steps S102 to S104. The control circuit 101 repeats the process until the determination in step S105 is YES.

Thus, when the equivalent parallel resistance values of all the frequencies set at predetermined frequency intervals in the nominal band are obtained (S105: YES), the control circuit 101 compares the equivalent parallel resistance values of each target frequency stored in the memory 102 with each other S106. Then, the control circuit 101 sets the target frequency for which the smallest equivalent parallel resistance value is obtained among these equivalent parallel resistance values to the optimum value of the transmission frequency S107. Thus, the control circuit 101 ends the process of FIG. 4.

In the process of FIG. 4, all the equivalent parallel resistance values for all the target frequencies are stored in the memory 102, and then all the stored equivalent parallel resistance values are compared to extract the smallest equivalent parallel resistance value, but the method of extracting the smallest equivalent parallel resistance value is not limited to this.

For example, every time the equivalent parallel resistance value is calculated, the control circuit 101 compares the calculated equivalent parallel resistance value with the equivalent parallel resistance value stored in the memory 102 as being the minimum until then, and if the calculated equivalent parallel resistance value is smaller, the calculated equivalent parallel resistance value is stored in the memory 102 instead of the equivalent parallel resistance value which has been the minimum until then, thereby obtaining the smallest equivalent parallel resistance value and its target frequency.

Figure 5A:
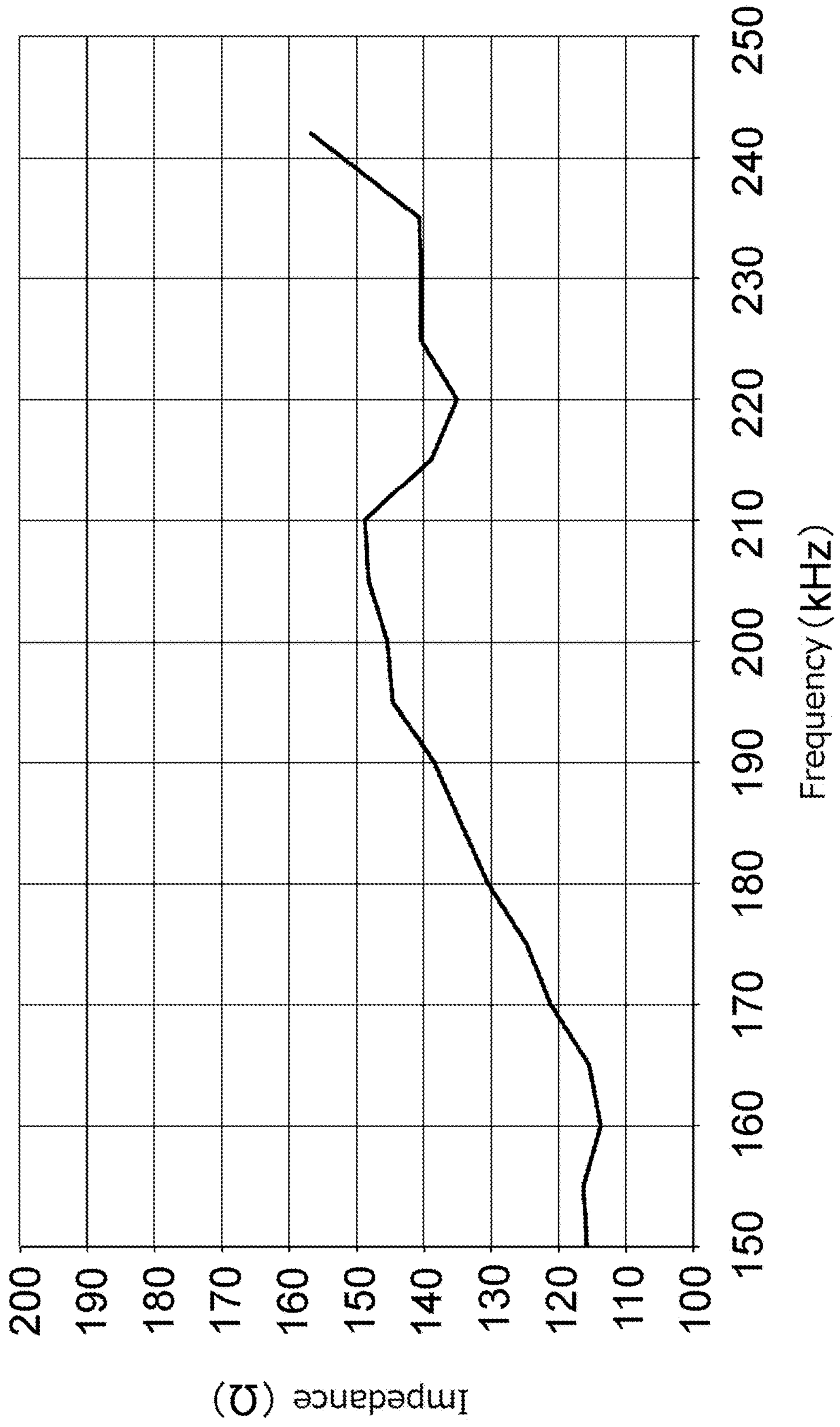
FIG. 5A is a graph showing an example of frequency-impedance characteristics of an ultrasonic oscillator, according to an embodiment of the present invention.
Figure 5B:
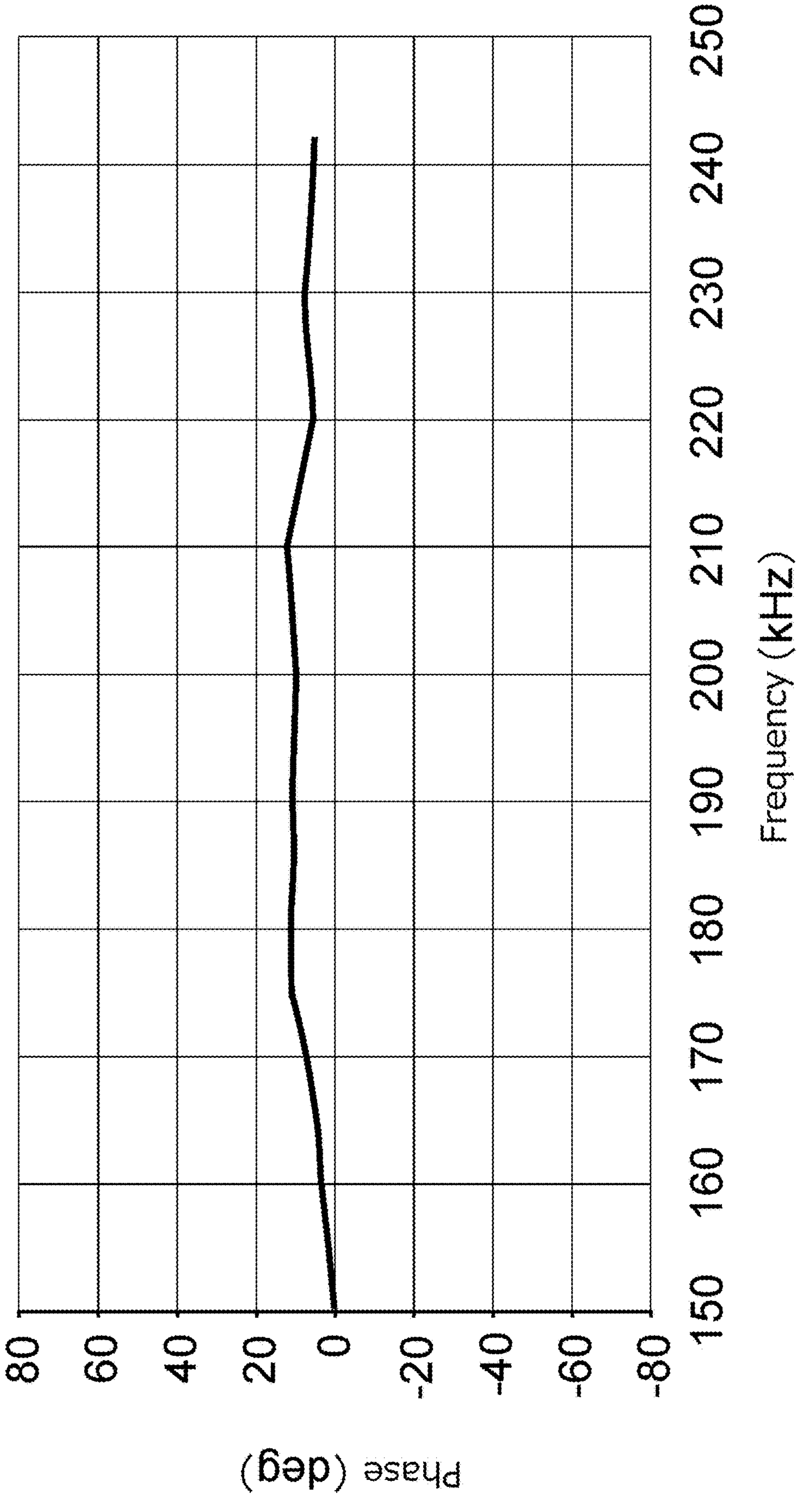
FIG. 5B is a graph showing an example of frequency-phase characteristics of an ultrasonic oscillator, according to an embodiment of the present invention.
Figure 5C:
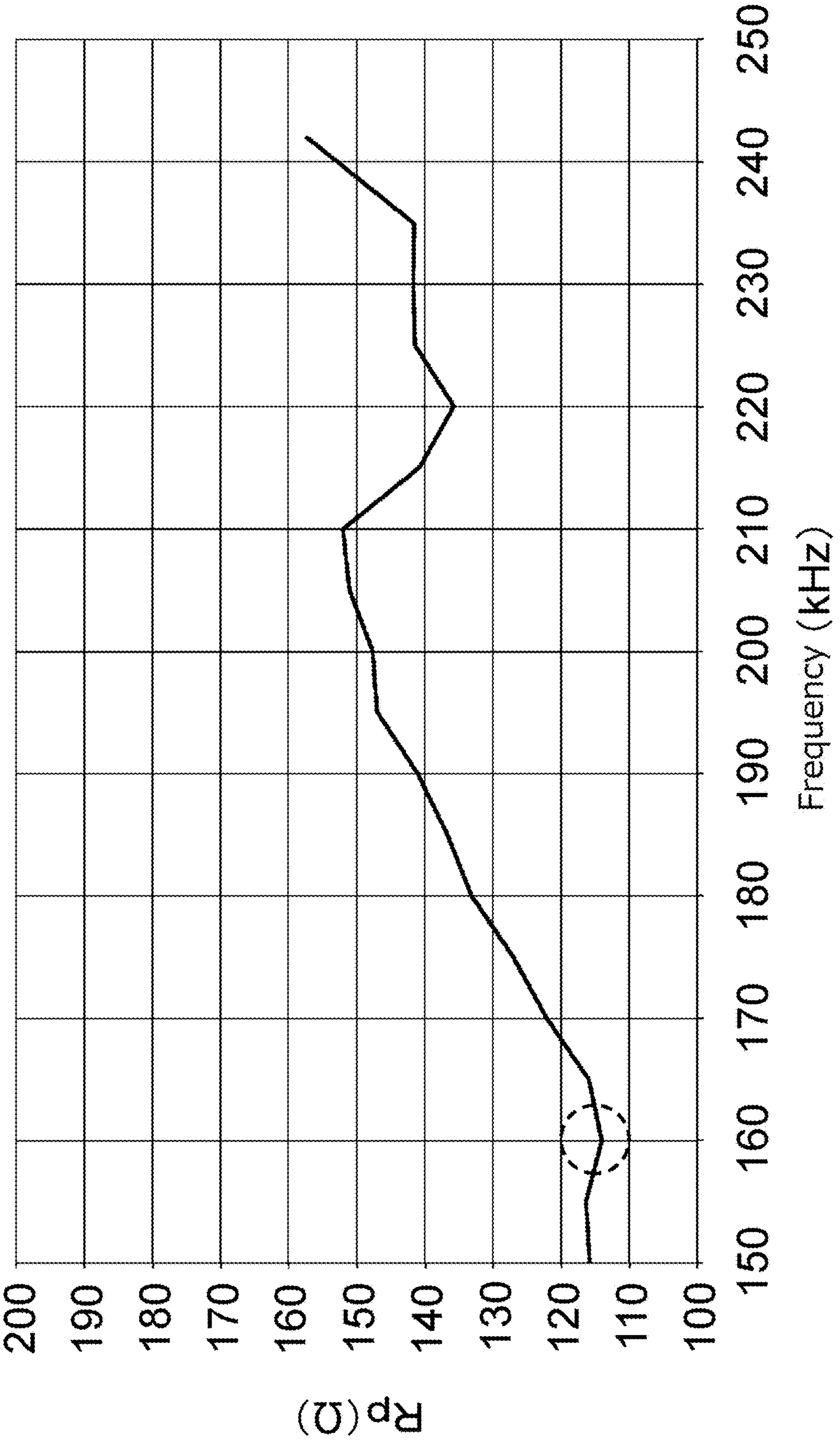
FIG. 5C is a graph showing an example of frequency-equivalent parallel resistance characteristics of an ultrasonic oscillator, according to an embodiment of the present invention.

FIGS. 5A to 5C are graphs showing examples of impedance Z, phase θ, and equivalent parallel resistance Rp of each target frequency calculated in step S103 of FIG. 4, respectively.

FIG. 5A shows an example of frequency-impedance characteristics of the ultrasonic oscillator 21, FIG. 5B shows an example of frequency-phase characteristics of the ultrasonic oscillator 21, and FIG. 5C shows an example of frequency-equivalent parallel resistance characteristics of the ultrasonic oscillator 21.

Here, the nominal band is set to about 150~240 kHz. As described above, the impedance characteristics of FIG. 5A are calculated by applying the measured value of transmission voltage Vm and the measured value of transmission current Im obtained at each target frequency to equation (1). The equivalent parallel resistance characteristics of FIG. 5C are calculated by applying the values of impedance Z at each target frequency in FIG. 5A and the phase θ at each target frequency in FIG. 5B to equation (2).

In the example of FIG. 5C, the value of equivalent parallel resistance Rp is minimum at around 160 kHz. Therefore, in this example, 160 kHz is set as the optimum value of the transmission frequency.

At the frequency where the equivalent parallel resistance Rp is the minimum, the transmission power of the ultrasonic oscillator 21 may be most efficiently increased. Therefore, the ultrasonic wave may be transmitted most efficiently by setting the frequency where the equivalent parallel resistance Rp is the minimum to the optimum value of the transmission frequency according to the process shown in FIG. 4.

Figure 6:
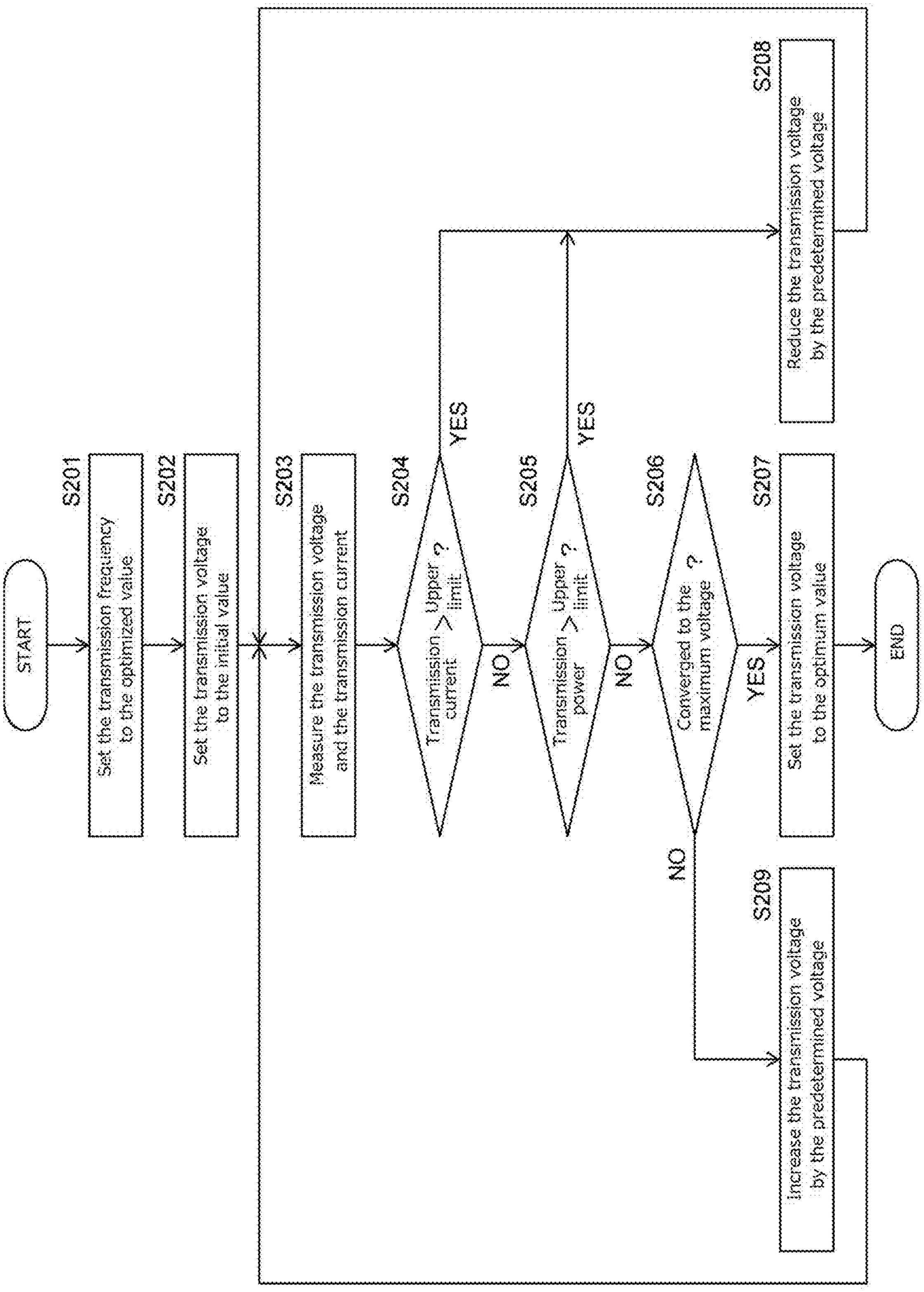
FIG. 6 is a flowchart showing a process for optimizing a transmission voltage, according to an embodiment of the present invention.

FIG. 6 is a flowchart showing the process for optimizing the transmission voltage according to an embodiment of the present invention.

The control circuit 101 sets the transmission frequency to the frequency optimized by the process shown in FIG. 4, S201, and sets the transmission voltage to the initial value S202. Here, the initial value is the minimum value in the proper operating range of the transmission voltage as described above. The control circuit 101 outputs the control signal corresponding to the set transmission frequency and transmission voltage to the transmission circuit 103, causes the transmission circuit 103 to output the transmission signal corresponding to the transmission frequency and transmission voltage, and obtains the measured values of the transmission voltage and transmission current from the transmission voltage measuring circuit 108 and the transmission current measuring circuit 109, S203.

The control circuit 101 determines whether the acquired transmission current exceeds the upper limit S204. As described above, the upper limit is a rated value of the transmission current defined from the hardware constraints of the transmission system including the transmission circuit 103. If the transmission current does not exceed the upper limit S204: NO, the control circuit 101 determines whether the transmission power calculated from the acquired transmission voltage and the transmission current exceed the upper limit S205. As described above, the upper limit is the rated power of the ultrasonic oscillator 21.

If neither the transmission current nor the transmission power exceed the upper limit S205: NO, the control circuit 101 determines whether the transmission voltage has converged to the maximum allowable value S206. In other words, the control circuit 101 determines whether the transmission voltage is reduced by the predetermined voltage in step S208, and then the determination in step S205 is NO and the process proceeds to step S206.

If the determination in step S206 is NO, that is, if the transmission voltage has not been reduced in step S208, the control circuit 101 increases the current transmission voltage by the predetermined voltage by increasing the current control voltage by the predetermined voltage S209, and returns the process to step S203. Here, the predetermined voltage is set to, for example, the voltage of the minimum width that may increase or decrease the transmission voltage. That is, the predetermined voltage is set to the voltage for one step when the transmission voltage is increased or decreased in steps. The transmission frequency is maintained at the optimum value set in step S201.

Thus, the control circuit 101 increases the transmission voltage by the predetermined voltage until the determination in either of steps S204 and S205 is YES, and the processing of steps S203 to S206 is repeatedly executed for each transmission voltage. Then, when the determination in either of steps S204 and S205 is YES, the control circuit 101 reduces the transmission voltage by the predetermined voltage by reducing the control voltage by the predetermined voltage S208, and returns the processing to step S203. The predetermined voltage is set to be the same as the predetermined voltage in step S209.

Then, the control circuit 101 executes the processing after step S203 with the reduced transmission voltage. In this case, the voltage value of the reduced transmission voltage is the voltage value applied to the processing after the previous step S203, and the determination of this voltage value in steps S204 and S205 in the previous processing is NO. Therefore, it is normally assumed that the determination of steps S204 and S205 is NO this time as well. However, exceptionally, if any of the determinations in steps S204 and S205 this time is YES, the control circuit 101 reduces the transmission voltage by the predetermined voltage again in step S208, and executes the processing from step S203 onwards.

Thus, if the determinations in steps S204 and S205 are NO based on the reduced transmission voltage, the control circuit 101 determines in step S206. In this case, since the control circuit 101 has already reduced the transmission voltage in step S208, the determination in step S206 is YES. The transmission voltage at this time is the maximum voltage value within the range where both the transmission current and the transmission power do not exceed the respective upper limit values.

If the determination in step S206 is YES, the control circuit 101 sets the transmission voltage (control voltage) at this time to the optimum value S207 and ends the processing. After that, the control circuit 101 causes the transmission circuit 103 to output the transmission signal to which the optimum value of the transmission frequency set by the processing in FIG. 4 and the optimum value of the transmission voltage set by the processing in FIG. 6 are applied, and transmits the ultrasonic wave in actual operation. Thus, the ultrasonic wave may be transmitted efficiently and properly, and the display operation of the echo image may be performed smoothly and properly.

It should be noted that the predetermined voltages defined in steps S208 and S209 do not necessarily have to be voltages of the minimum width that may increase or decrease the transmission voltage. For example, the predetermined voltage in step S209 may change according to the number of times the transmission voltage is increased. That is, until the number of times the transmission voltage is increased reaches the predetermined number of times (for example, several times), the voltage for a plurality of steps when the transmission voltage is increased or decreased in a stepwise manner is set to the predetermined voltage, and after the number of times the transmission voltage is increased reaches the predetermined number of times (for example, several times), the voltage for one step when the transmission voltage is increased or decreased in a stepwise manner may be set to the predetermined voltage.

Also, the predetermined voltages in steps S209 and S208 do not necessarily have to be the same. For example, the predetermined voltage in step S208 may be larger than the predetermined voltage in step S209.

Effect of Embodiment

According to this embodiment, the following effects are achieved.

As shown in FIG. 2, the fish finder 100 (underwater detection device) includes a transmission circuit 103 that supplies a transmission voltage and a transmission current to the ultrasonic oscillator 21, a transmission voltage measuring circuit 108 that measures the transmission voltage supplied to the ultrasonic oscillator 21, a transmission current measuring circuit 109 that measures the transmission current supplied to the ultrasonic oscillator 21, and a control circuit 101. As shown in FIG. 3, the control circuit 101 optimizes the transmission conditions of the ultrasonic oscillator 21 based on the transmission voltage and the transmission current measured by the transmission voltage measuring circuit 108 and the transmission current measuring circuit 109, respectively S13.

As described above, the fish finder 100 (underwater detection device) may measure the transmission voltage and the transmission current of the ultrasonic oscillator 21 included in the transducer 2 by the transmission voltage measuring circuit 108 and the transmission current measuring circuit 109, so that the transmission conditions of the ultrasonic oscillator 21 may be optimized from these measurement results. Moreover, even if there are individual differences in the transducer 2, the actual transmission voltage and the transmission current of the ultrasonic oscillator 21 included in the transducer 2 may be measured, so that the optimum transmission conditions for the ultrasonic oscillator 21 may be set in the fish finder 100 (underwater detection device). Furthermore, even if the underwater environment such as the underwater temperature changes, the transmission voltage and the transmission current of the ultrasonic oscillator 21 may be measured under that environment, so that the optimum transmission conditions corresponding to the underwater environment may be set in the fish finder 100 (underwater detection device). Therefore, the transmission conditions of the ultrasonic oscillator 21 included in the transducer 2 may be easily and accurately optimized.

As shown in FIG. 6, the control circuit 101 optimizes the transmission conditions of the ultrasonic oscillator 21 based on the transmission voltage and the transmission current measured by the transmission voltage measuring circuit 108 and the transmission current measuring circuit 109 under actual use conditions (upper limit of steps S204 and S205). By this process, the transmission conditions of the ultrasonic oscillator 21 are optimized under actual use conditions, so that the ultrasonic oscillator 21 may properly transmit waves under the optimized transmission conditions for actual use of the fish finder 100 (underwater detection device).

As shown in FIG. 6, the control circuit 101 optimizes the transmission voltage to optimize the transmission conditions. In this case, the control circuit 101 optimizes the transmission voltage by increasing the transmission voltage within a range in which the transmission power, calculated from the transmission voltage and the transmission current, and the transmission current do not exceed the respective upper limit values (S204: NO, S205: NO) S209. Thus, the transmission voltage as high as possible may be set to the optimum value of the transmission voltage within a range in which the transmission power and the transmission current do not exceed the respective upper limit values.

As shown in FIG. 6, the control circuit 101 repeatedly executes control S209 to increase the transmission voltage applied to the ultrasonic oscillator 21 by a predetermined voltage from the current transmission voltage on the condition that the transmission power and the transmission current measured by the current transmission voltage do not exceed the respective upper limit values (S204: NO, S205: NO). Thus, the transmission power and the transmission current may gradually approach the respective upper limit values as the transmission voltage increases, and the transmission voltage may be smoothly set to the highest voltage value as possible.

As shown in FIG. 6, when the transmission power and the transmission current measured by the current transmission voltage exceed the respective upper limit values (S204: YES or S205: YES), the control circuit 101 performs control S208 to reduce the transmission voltage by a predetermined voltage and return it to the transmission voltage immediately before the upper limit value is exceeded.

In addition, the control circuit 101 reduces the transmission voltage by a predetermined voltage and returns it to the transmission voltage immediately before exceeding the upper limit value S208, and if the condition S204, S205 is satisfied S206: YES, the optimization of the transmission voltage is completed S207.

According to this configuration, the transmission voltage may be set to a voltage value as high as possible within a range in which the transmission power and the transmission current do not exceed the upper limit values.

In this case, the predetermined voltage in step S209 may be set to a voltage of the minimum width in which the transmission voltage may be increased or decreased. Thus, when the transmission voltage is increased by a predetermined voltage value from a state in which the transmission power and the transmission current are slightly lower than the upper limit values, the transmission power and the transmission current may be suppressed from greatly exceeding the upper limit values. Therefore, it is possible to prevent the transmission power and the transmission current from being applied excessively to the ultrasonic oscillator 21 and the transmission system, causing damage or the like to the ultrasonic oscillator 21 and the transmission system.

As shown in FIG. 4, the control circuit 101 optimizes the transmission frequency as an optimization of the transmission conditions. In this case, the control circuit 101 acquires the transmission voltage and the transmission current from the transmission voltage measuring circuit 108 and the transmission current measuring circuit 109 while changing the frequency of the transmission signal S101, S102, calculates the equivalent parallel resistance from the acquired transmission voltage and the transmission current for each frequency S103, and acquires the frequency at which the value of the calculated equivalent parallel resistance is minimum as the optimum value of the transmission frequency S107. Thus, the transmission frequency at which power may be most efficiently applied to the ultrasonic oscillator 21 may be set in the underwater detection device.

Modified Example 1

In the above-described embodiment, the transmission frequency and the transmission voltage were optimized, but in Modified Example 1, a process for appropriately switching to another transmission frequency when the transmission frequency overlaps with another ship is further executed in the process of optimizing the transmission voltage.

Figure 7:
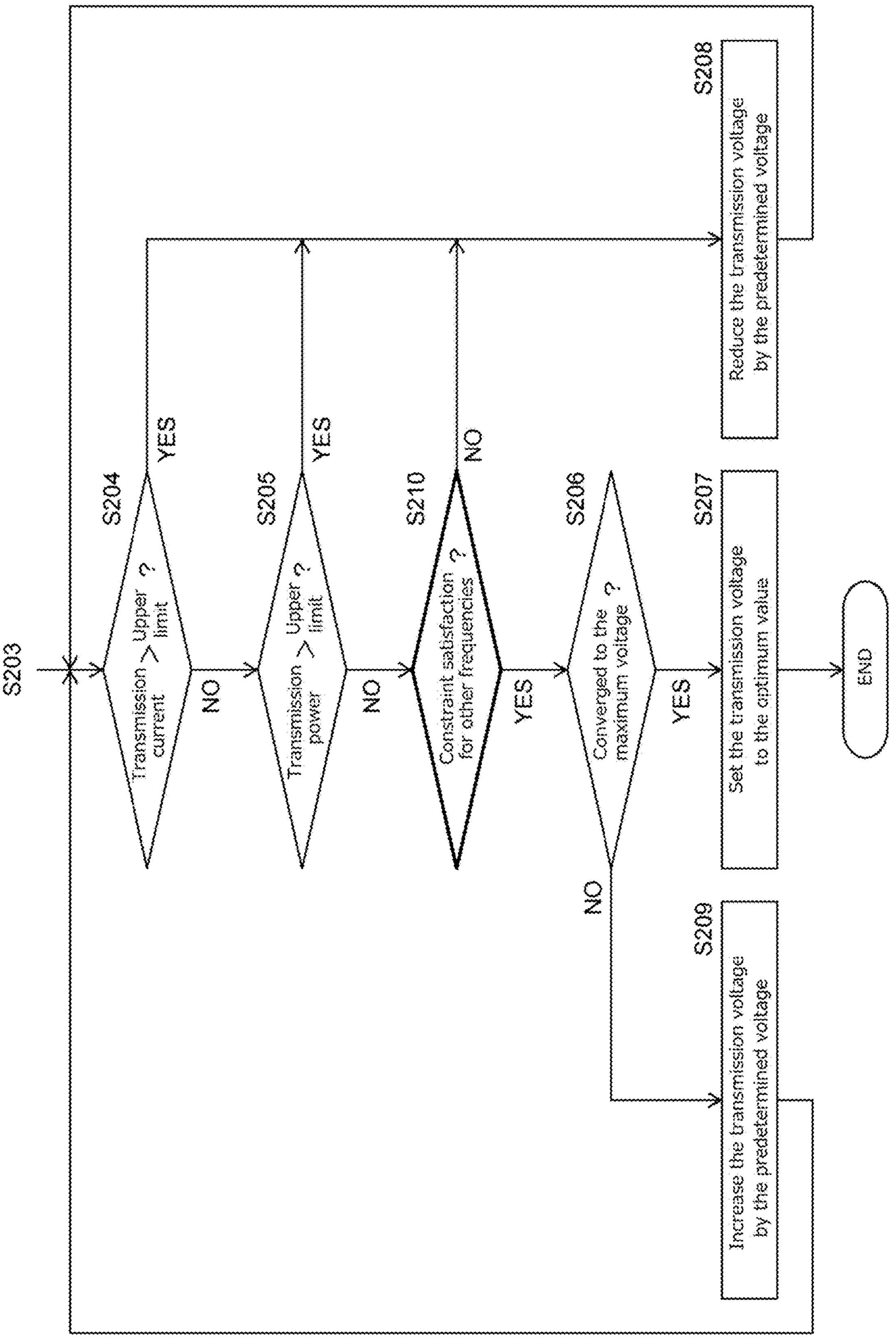
FIG. 7 is a flowchart showing a process for optimizing a transmission voltage, according to a Modified Example 1.

FIG. 7 is a flowchart showing the process for optimizing the transmission voltage according to Modified Example 1.

FIG. 7 shows the process flow from step S204 onwards for convenience. The process of steps S201 to S203 is the same as the corresponding process in FIG. 6. In the flowchart of FIG. 7, step S210 is added to the flowchart of FIG. 6. In the flowchart of FIG. 7, the processing of the steps other than step S210 is the same as that of the corresponding step in FIG. 6.

If the determination in steps S204 and S205 is NO, the control circuit 101 further determines whether the transmission power and the transmission current obtained by the current transmission voltage do not exceed the respective upper limit values at a plurality of transmission frequencies that may be used for transmitting ultrasonic waves, i.e., all the frequencies in the above-mentioned nominal band S210.

In step S210, the control circuit 101 causes the transmission circuit 103 to output a transmission signal at the current transmission voltage while changing the transmission frequency in the nominal band at predetermined frequency intervals, and obtains the transmission voltage and the transmission current at each frequency from the transmission voltage measuring circuit 108 and the transmission current measuring circuit 109, respectively. The control circuit 101 calculates the transmission power for each frequency for the obtained transmission voltage and the transmission current at each frequency. Then, the control circuit 101 determines the same as in steps S204 and S205 for the transmission current and the transmission power at each frequency.

If either the transmission current or the transmission power exceeds the respective upper limit (same upper limit as in steps S204 and S205) at any frequency, the control circuit 101 determines NO at step S210 and reduces the current transmission voltage by the predetermined voltage S208. On the other hand, if neither the transmission current nor the transmission power exceeds the respective upper limit (same upper limit as in steps S204 and S205) at any frequency, the determination at step S210 determines YES and the process proceeds to step S206. The processing after step S206 is the same as that of FIG. 6 in the above embodiment.

According to the processing of Modified Example 1, the optimum value of the transmission voltage set in step S207 is set to a voltage value at which the transmission current and the transmission power do not exceed the respective upper limit values even if the transmission frequency is changed from the optimum value set by the processing of FIG. 4 to another frequency within the nominal band. Therefore, even if the transmission frequency of the ultrasonic oscillator 21 is switched from the optimum value to another transmission frequency due to interference with the ultrasonic wave transmitted from another ship, the transmission voltage is set to the optimum value obtained in step S207, so that the transmission of the ultrasonic wave at the transmission voltage set to the highest possible voltage (optimized) in the other transmission frequency may be properly carried out.

In step S210 of FIG. 7, it is judged whether the conditions of steps S204 and S205 are satisfied for all the frequencies within the nominal band, but the frequency to be judged is not limited to this. For example, several (plural) frequencies previously set in the nominal band may be judged at step S210, or in the processing of FIG. 4, a plurality of frequencies having the equivalent parallel resistance value of about 2 to 5 from the top may be judged at step S210.

In addition, in the modified example 1, as shown in FIG. 7, in the processing for optimizing the transmission voltage, step S210 is added beforehand so that the transmission frequency may be changed immediately even if the transmission frequency interference with another ship occurs. However, this is not limited to this, and after the actual operation is performed by setting the optimum values obtained by the processing of FIGS. 4 and 6 to the transmission frequency and the transmission voltage of the transmission signal, the processing of FIG. 6 may be performed with the transmission frequency without interference with another ship in response to the occurrence of the transmission frequency interference with another ship, and the optimum value of the transmission voltage may be re-set.

Modified Example 2

In the above embodiment, the optimization processes shown in FIGS. 3, 4, and 6 are executed immediately after the start of the fish finder 100, when the operation is interrupted, or by an arbitrary instruction from the user. In contrast, in Modified Example 2, these optimization processes are executed in parallel with the actual operation of the fish finder 100. More specifically, the control circuit 101 causes the transmission circuit 103 to output a transmission signal for optimizing the transmission condition in one sequence for transmitting and receiving ultrasonic waves for fish finding.

Figure 8:
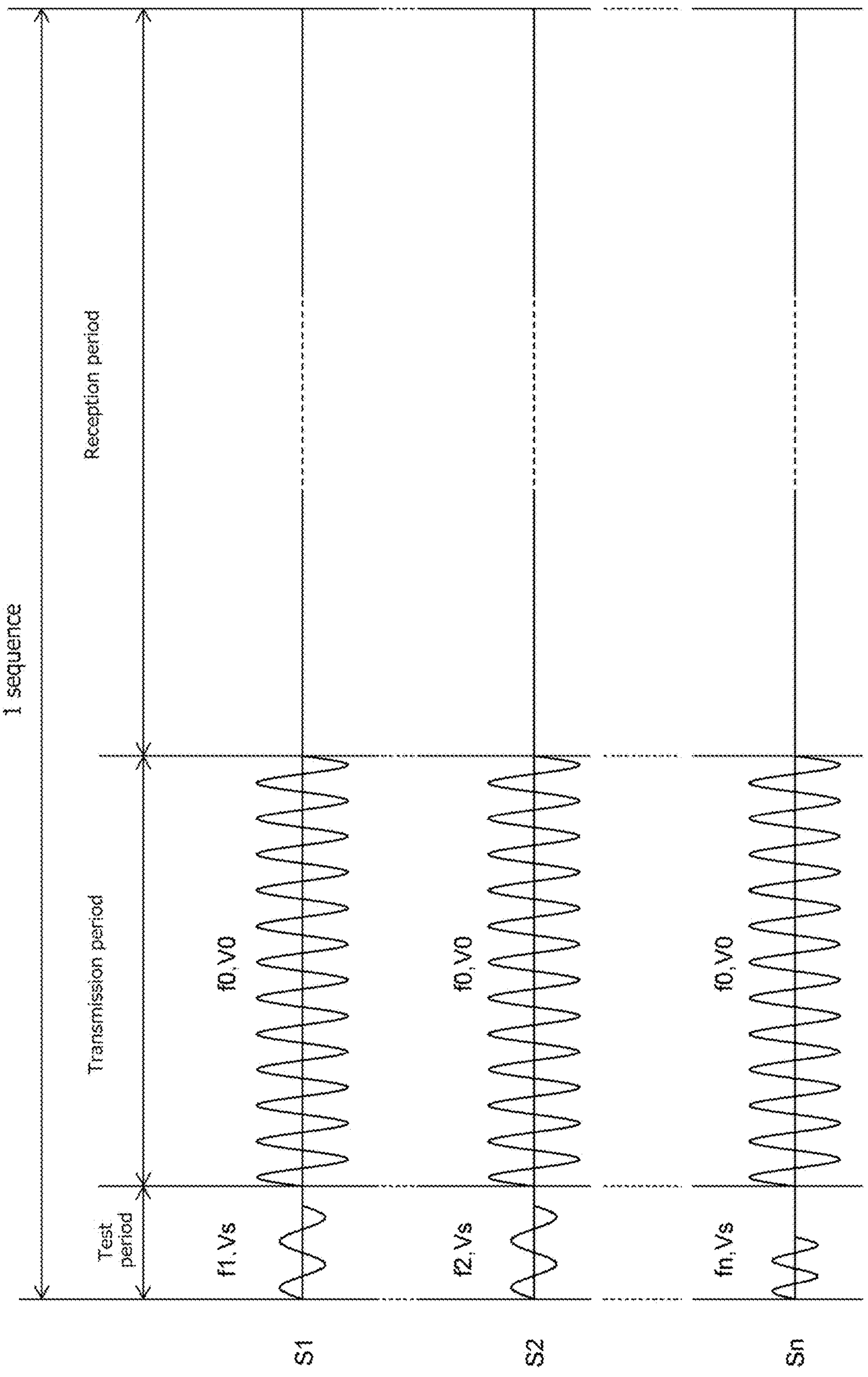
FIG. 8 is a diagram schematically showing a test period added to one sequence for carrying out the transmission frequency optimization process, according to a Modified Example 2.

FIG. 8 is a diagram schematically showing a test period added to one sequence for carrying out the transmission frequency optimization process according to a Modified Example 2.

As shown in FIG. 8, in one sequence, a test period for applying a transmission signal (hereinafter referred to as "test signal") for optimizing the transmission frequency is set as well as a transmission period for transmitting ultrasonic waves and a reception period for receiving reflected waves of ultrasonic waves.

In the transmission period, ultrasonic waves are transmitted by a transmission signal whose transmission frequency and transmission voltage are the optimum values f0 and V0, respectively. The optimum values f0 and V0 at the time of starting the fish finder 100 may be obtained by, for example, performing the processes shown in FIGS. 4 and 6 in response to starting the fish finder 100. Alternatively, the optimum values f0 and V0 at the time of starting may be default values, or the optimum values f0 and V0 obtained at the time of the last operation termination of the fish finder 100. Thereafter, the control circuit 101 performs transmission and reception with the transmission signals having the optimum values f0 and V0, and performs transmission frequency optimization processing (FIG. 9) while changing the frequency of the test signal within the nominal band during the test period.

Referring to FIG. 8, the control circuit 101 causes the transmission circuit 103 to output a test signal having the frequency f1 and the voltage Vs during the test period of the sequence S1. The frequency f1 is, for example, the minimum frequency in the nominal band. The voltage Vs is an initial value set in step S102 of FIG. 4. During the test period of the next sequence S2, the control circuit 101 causes the transmission circuit 103 to output a test signal having the frequency f2 and the voltage Vs. The frequency f2 is, for example, the second frequency from the bottom 4 in the nominal band.

Thus, the control circuit 101 causes the transmission circuit 103 to output a test signal in which only the frequency is changed within the nominal band during the test period of each sequence. The control circuit 101 causes the transmission circuit 103 to output a test signal with the last frequency fn within the nominal band during the test period of the sequence n, thereby ending the output of the test signal for the transmission frequency optimization process.

Figure 9:
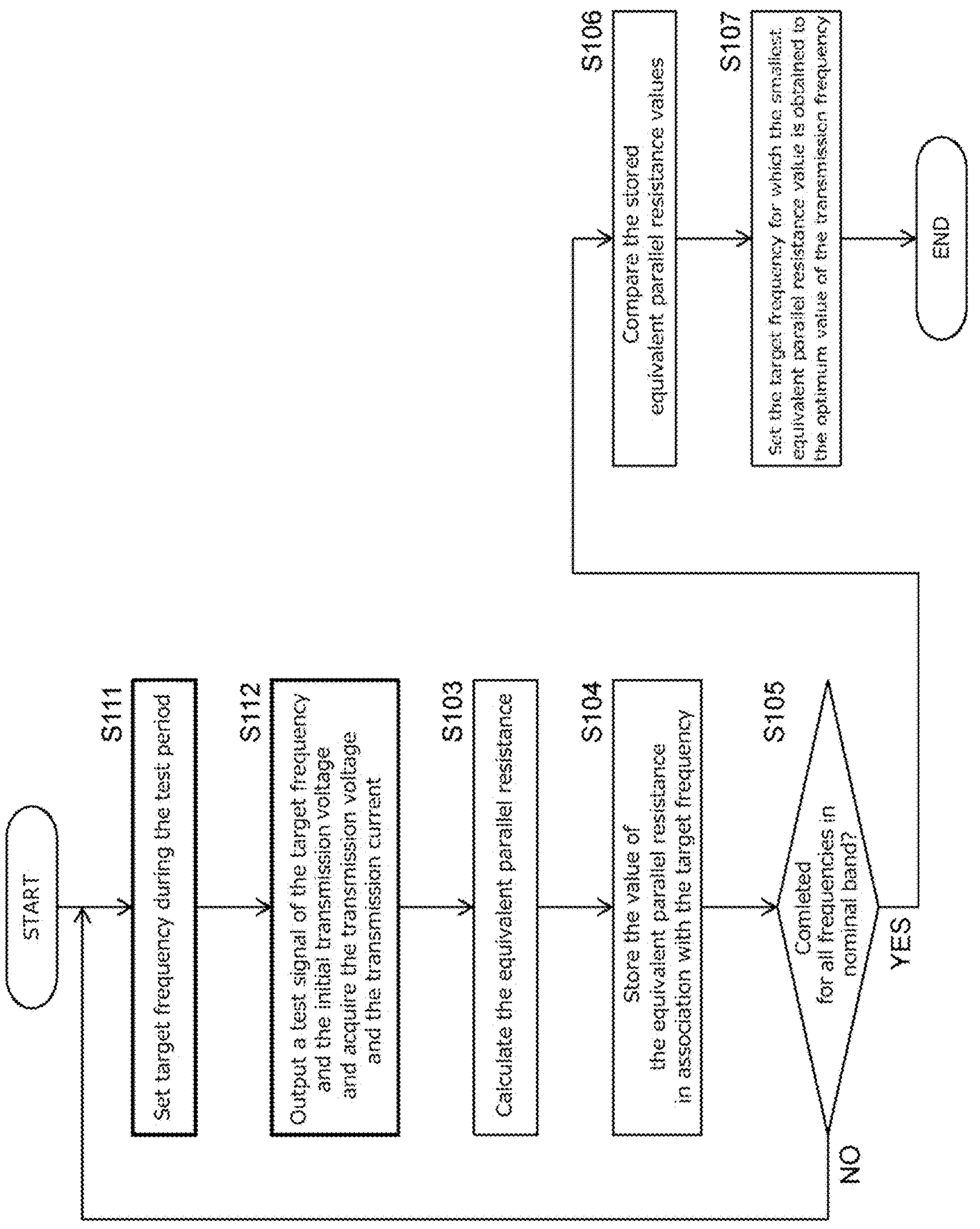
FIG. 9 is a flowchart showing a process for optimizing a transmission frequency, according to the Modified Example 2.

FIG. 9 is a flowchart showing the process for optimizing the transmission frequency according to the modified Example 2.

In the flowchart of FIG. 9, steps S101 and S102 in the flowchart of FIG. 4 are replaced with steps S111 and S112. The processes of the other steps are the same as those of the corresponding steps in FIG. 4.

In step S111, the control circuit 101 sets one target frequency within the nominal band during the test period of FIG. 8. In step S112, the control circuit 101 causes the transmission circuit 103 to output a test signal of the target frequency and the initial transmission voltage, during the test period of 1 sequence, and acquires the transmission voltage and the transmission current from the transmission voltage measuring circuit 108 and the transmission current measuring circuit 109, respectively. In steps S103 and S104, the control circuit 101 calculates and stores the value of the equivalent parallel resistance from the acquired transmission voltage and the transmission current.

The control circuit 101 repeatedly executes the processes of steps S111 to S104 for each sequence while changing the target frequency set in the test period within the nominal band. Thus, when the calculation and storage of the value of the equivalent parallel resistance for all frequencies within the nominal band is completed S105: YES, the control circuit 101 sets the target frequency corresponding to the value of the minimum equivalent parallel resistance to the optimum value of the transmission frequency S106, S107, and ends the process of FIG. 9.

In the modified example 2, as in the transmission frequency optimization process of the above-described embodiment, each time the value of the equivalent parallel resistance is calculated, the value of the equivalent parallel resistance stored in the memory 102 as the minimum value is compared with the calculated value of the equivalent parallel resistance, and if the calculated value of the equivalent parallel resistance is smaller, the calculated value of the equivalent parallel resistance may be stored in the memory 102 instead of the value of the equivalent parallel resistance that has been the minimum value.

Figure 10:
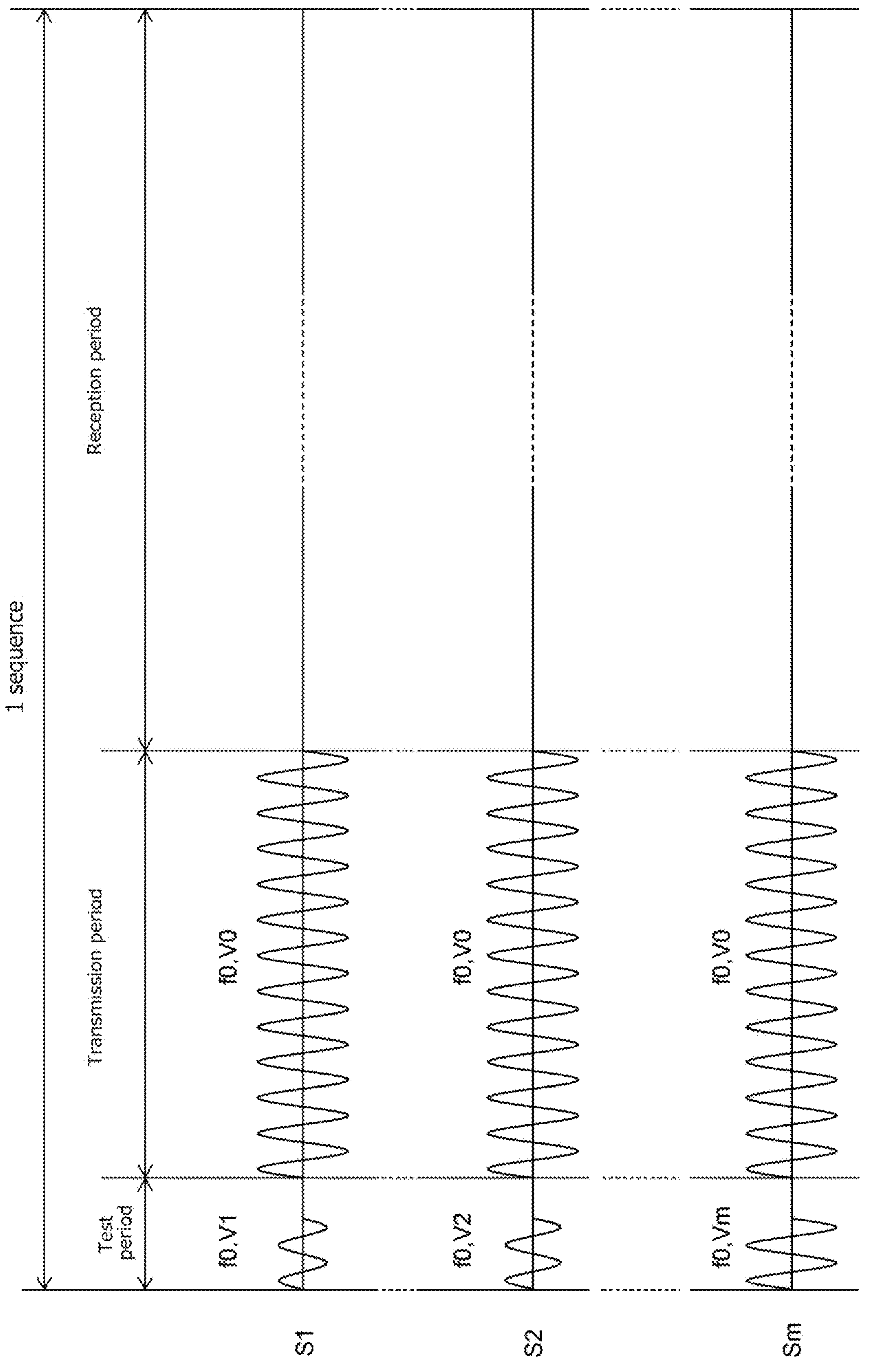
FIG. 10 is a diagram schematically showing a test period added to one sequence for carrying out the transmission voltage optimization process, according to the Modified Example 2.

FIG. 10 is a diagram schematically showing a test period added to 1 sequence for carrying out the transmission voltage optimization process according to Modified Example 2.

Each sequence in FIG. 10 is performed following the sequence Sn in FIG. 8. In each sequence in FIG. 8, the frequency of the test signal is changed from f1 to fn without changing the voltage value Vs of the test signal in each test period. In each sequence in FIG. 10, the voltage value of the test signal is changed from V1 to Vm without changing the frequency f0 of the test signal in each test period. The frequency f0 is the optimum value of the transmission frequency obtained in the process in FIG. 9. The voltage value V1 is the initial value of the transmission voltage in step S202 in FIG. 6.

Figure 11:
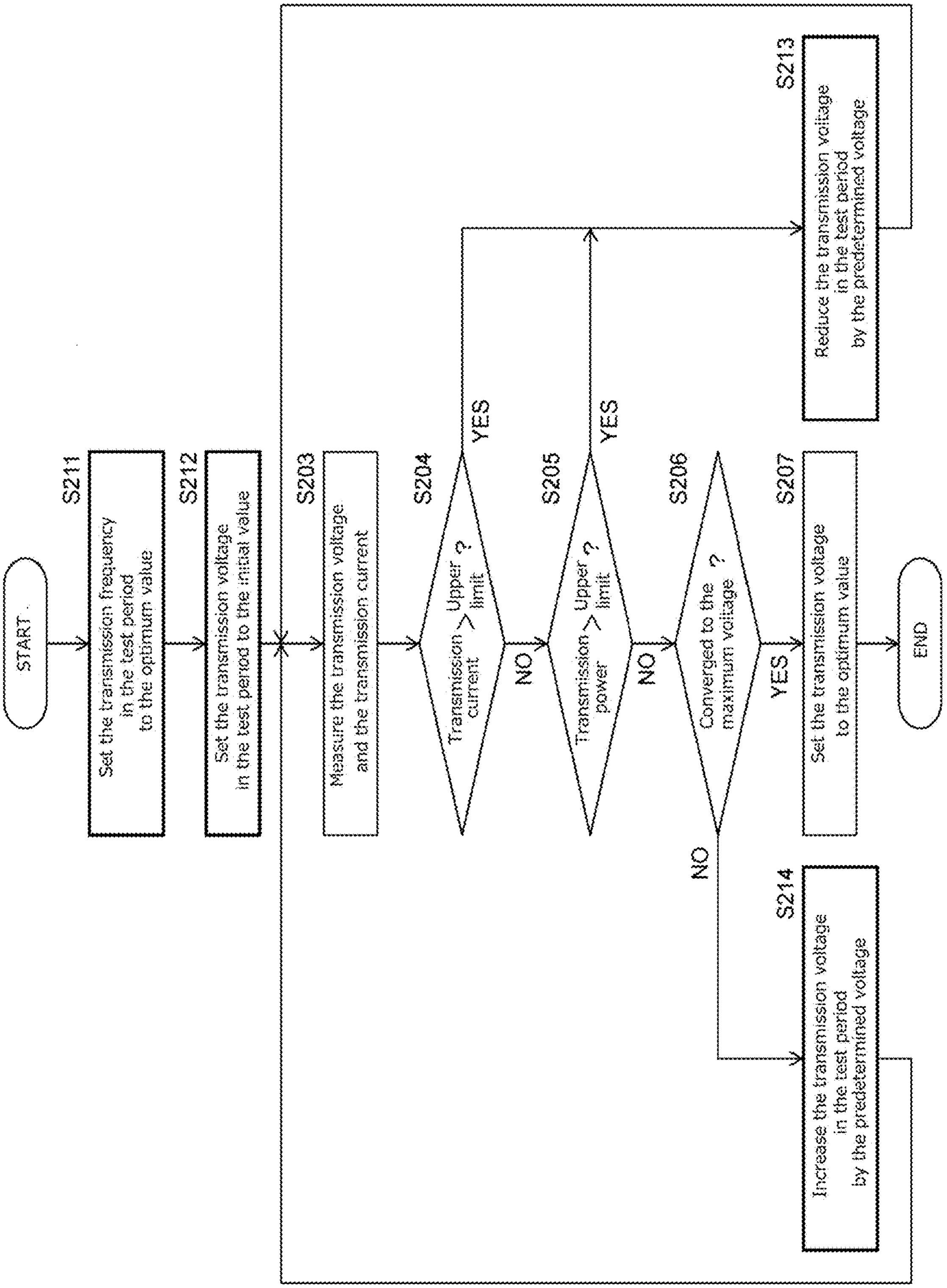
FIG. 11 is a flowchart showing a process for optimizing a transmission voltage, according to the Modified Example 2.

FIG. 11 is a flowchart showing the process for optimizing the transmission voltage according to modified example 2.

In the flowchart in FIG. 11, steps S201, S202, S208, and S209 in the flowchart in FIG. 6 are replaced with steps S211, S212, S213, and S214, respectively. The processes of the other steps are the same as those of the corresponding steps in FIG. 6.

In step S211, the control circuit 101 sets the transmission frequency of the test signal in the test period of each sequence to the optimum value obtained in the process of FIG. 9. In step S212, the control circuit 101 sets the transmission voltage of the test signal in the test period of the first sequence to the initial value. Then, in the test period of the first sequence, the control circuit 101 causes the transmission circuit 103 to output the test signal of the transmission frequency and transmission voltage set in steps S211 and S212, and performs the processes of steps S203 to S206.

If the determination in steps S204 to S206 is NO, the control circuit 101 increases the transmission voltage of the test signal in the next sequence by the predetermined voltage S214. On the other hand, if the determination in any of steps S204 and S205 is YES, the control circuit 101 decreases the transmission voltage of the test signal in the next sequence by the predetermined voltage S213.

The control circuit 101 repeatedly executes the processes of steps S203 to S206, S213, and S214 until the determination in step S206 is YES, and changes the transmission voltage of the test signal set in the test period of each sequence. When the determination in step S206 is YES, the voltage value of the transmission voltage of the test signal set at that time is set to the optimum value of the transmission voltage S207, and the process of FIG. 11 ends.

Thus, when the process shown in FIG. 11 is completed, the control circuit 101 sets the optimum values of the transmission frequency and transmission voltage obtained by the process shown in FIGS. 9 and 11 to the transmission frequency and transmission voltage in the subsequent actual operation of fish finding. Then, the control circuit 101 again executes the process shown in FIG. 9 to obtain the optimum value of the transmission frequency, and further executes the process shown in FIG. 11 to obtain the optimum value of the transmission voltage. The control circuit 101 resets the newly obtained optimum values to the transmission frequency and transmission voltage in the subsequent actual operation. Thereafter, the control circuit 101 repeatedly executes the process of resetting the transmission frequency and transmission voltage. Thus, the control circuit 101 resets the obtained optimum values to the transmission frequency and transmission voltage in the actual operation, and performs transmission and reception for fish finding.

Thus, in the processes of FIGS. 8 to 11, a transmission signal (test signal) for optimizing transmission conditions is outputted from the transmission circuit 103 in one sequence in which transmission and reception of ultrasonic waves are performed for fish finding. That is, the control circuit 101 causes the transmission circuit 103 to output a transmission signal (test signal) for optimizing transmission conditions at a timing different from the transmission of ultrasonic waves for fish finding.

Thus, a transmission signal for optimization may be outputted from the transmission circuit 103 in parallel in one sequence of transmission and reception waves, and the transmission voltage and transmission current may be measured by the transmission voltage measuring circuit 108 and the transmission current measuring circuit 109. Therefore, the transmission conditions of the ultrasonic oscillator 21 may be optimized in real time in parallel with the actual fish finding operation.

In the processing of FIGS. 8 and 9, the reflected wave of the ultrasonic wave transmitted by the test signal of each sequence may be received in the reception period together with the reflected wave of the ultrasonic wave for detection transmitted in the transmission period. However, since most of the frequency of the test signal of each sequence is different from the transmission frequency of the transmission period, most of the reception signal based on the reflected wave of the test signal is removed by the filter of the reception circuit 104.

In addition, since it is sufficient to obtain the transmission current, transmission voltage and phase from the transmission voltage measuring circuit 108 and the transmission current measuring circuit 109 in the test period, the output period of the test signal, i.e., the test period, may be remarkably short. Therefore, even if the reception signal based on the test signal may not be removed from the reception signal based on the transmission signal in the transmission period by the filter, the influence of the test signal on the echo image is negligible. Therefore, even if the test signal is output including the test period in 1 sequence as shown in FIG. 8, the influence of the test signal on the echo image is negligible.

Similarly, even if the test signal is output including the test period in 1 sequence as shown in FIG. 10, the influence of the test signal on the echo image is negligible. Therefore, according to the configuration of modified example 2, it is possible to properly optimize the transmission conditions of the ultrasonic oscillator 21 in real time while properly performing the actual operation of the fish finding.

If the processing of FIG. 11 is modified in the same manner as in modified example 1 (FIG. 7), in step S210, the same processing as in steps S204 and S205 may be executed with the current transmission voltage while the transmission frequency is changed within the nominal band during the test period of each sequence. Thus, the same processing as in FIG. 7 may be realized. In this case, as in modified example 1, the frequencies to be processed in step S210 need not be all the frequencies within the nominal band, but may be several (plural) frequencies included in the nominal band.

Other Modified Examples

The present invention is not limited to the above-described embodiments and modified examples 1 and 2. In addition, the embodiment of the present invention may be modified in various ways other than the above-described configuration.

For example, in the above-described embodiment and modified examples 1 and 2, optimization of the transmission frequency and optimization of the transmission voltage were performed as the optimization of the transmission condition, but optimization of the transmission condition is not limited thereto. For example, only one of the optimization processing of the transmission frequency and the optimization processing of the transmission voltage may be performed, and a value set by default or the like may be used for the other. Specifically, if the processing of FIG. 4 is omitted and only the processing of FIG. 6 is performed, for example, in step S201 of FIG. 6, a frequency suitable for the fish finder 100 and the transducer 2 set by the service man and stored in the memory 102 may be set as the transmission frequency.

Moreover, the optimization processing of the transmission frequency and the optimization processing of the transmission voltage may not necessarily be performed as a pair. For example, after the optimization processing of the transmission frequency and the transmission voltage are performed, only the optimization processing of the transmission voltage may be performed for a certain period of time.

Further, although the test period is set for all of the sequences in FIGS. 8 and 10, the test period may be set for each of a predetermined number of sequences, and the processing of FIGS. 9 and 11 may be performed. In addition, the processing of FIGS. 9 and 11 may not be performed in parallel during all of the actual operation period of the fish finder 100. For example, the processing of FIGS. 9 and 11 may be performed in parallel with the actual operation of the fish finder 100 every predetermined time or every predetermined traveling distance.

In FIGS. 8 and 10, a test period is set at the beginning of each sequence, but the position of the test period in each sequence is not limited thereto. For example, the test period may be set following the wave reception period.

In the above-described embodiment and modified examples 1 and 2, an example of applying the present invention to the fish finder 100 mounted on the ship 1 was shown, but the application of the present invention is not limited thereto. For example, the present invention may be applied to a fish finder 100 installed on a fixed net, or the present invention may be applied to an underwater detection device other than a fish finder 100 such as a scanning sonar. In addition, the transducer 2 does not necessarily have to have a configuration in which one ultrasonic oscillator 21 is used for both transmission and reception, but may have a configuration in which an ultrasonic oscillator 21 for transmission and an ultrasonic oscillator 21 for reception are individually provided.

In addition, the embodiment of the present invention may be modified as required within the scope of the claims.

In addition to the embodiments of the underwater detection device, transmission condition optimization method, and a non-transitory computer-readable medium described in the claims, the present invention may also be extracted as an ultrasonic transmitting/receiving device, transmission condition optimization method of the ultrasonic transmitting/receiving device, and a non-transitory computer-readable medium in which the processing circuitry 10 of the ultrasonic transmitting/receiving device performs a predetermined function. The ultrasonic transmitting/receiving device according to this embodiment has the same configuration as the processing circuitry 10 described in the claims, and the transmission condition optimization method of the ultrasonic transmitting/receiving device and the non-transitory computer-readable medium according to this embodiment can have the same processes and functions as the method and the non-transitory computer-readable medium described in the claims.

TERMINOLOGY

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules executed by a computing system that includes one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processor. A processor can be a microprocessor, but in the alternative, the processor can be a controller, microcontroller, or state machine, combinations of the same, or the like. A processor can include electrical circuitry configured to process computer-executable instructions. In another embodiment, a processor includes an application specific integrated circuit (ASIC), a field programmable gate array (FPGA) or other programmable device that performs logic operations without processing computer-executable instructions. A processor can also be implemented as a combination of computing devices, e.g., a combination of a digital signal processor (DSP) and a microprocessor, a plurality of microprocessors, one or more microprocessors in conjunction with a DSP core, or any other such configuration. Although described herein primarily with respect to digital technology, a processor may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can", "could", "might" or "may" unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z" unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C. The same holds true for the use of definite articles used to introduce embodiment recitations. In addition, even if a specific number of an introduced embodiment recitation is explicitly recited, those skilled in the art will recognize that such recitation should typically be interpreted to mean at least the recited number (e.g., the bare recitation of "two recitations" without other modifiers, typically means at least two recitations, or two or more recitations).

It will be understood by those within the art that, in general, terms used herein, are generally intended as "open" terms (e.g., the term "including" should be interpreted as "including but not limited to" the term "having" should be interpreted as "having at least" the term "includes" should be interpreted as "includes but is not limited to" etc.).

For expository purposes, the term "horizontal" as used herein is defined as a plane parallel to the plane or surface of the floor of the area in which the system being described is used or the method being described is performed, regardless of its orientation. The term "floor" can be interchanged with the term "ground" or "water surface." The term "vertical" refers to a direction perpendicular to the horizontal as just defined. Terms such as "above", "below", "bottom", "top", "side", "higher", "lower", "upper", "over" and "under" are defined with respect to the horizontal plane.

As used herein, the terms "attached", "connected", "mated" and other such relational terms should be construed, unless otherwise noted, to include removable, moveable, fixed, adjustable, and/or releasable connections or attachments. The connections/attachments can include direct connections and/or connections having intermediate structure between the two components discussed.

Numbers preceded by a term such as "approximately", "about" and "substantially" as used herein include the recited numbers, and also represent an amount close to the stated amount that still performs a desired function or achieves a desired result. For example, the terms "approximately", "about" and "substantially" may refer to an amount that is within less than 10% of the stated amount. Features of embodiments disclosed herein preceded by a term such as "approximately", "about" and "substantially" as used herein represent the feature with some variability that still performs a desired function or achieves a desired result for that feature.

It should be emphasized that many variations and modifications may be made to the above-described embodiments, the elements of which are to be understood as being among other acceptable examples. All such modifications and variations are intended to be included herein within the scope of this disclosure and protected by the following claims.

What is claimed is:

1. An underwater detection device, comprising:
processing circuitry configured to:
supply a transmission voltage and a transmission current to an ultrasonic oscillator;
measure the transmission voltage;
measure the transmission current; and
optimize the transmission voltage as an optimization of a transmission condition of the ultrasonic oscillator by repeatedly executing control to increase the transmission voltage by a predetermined voltage from the current transmission voltage on a condition that the transmission power, calculated from the transmission voltage and the transmission current, and the transmission current, measured by the current transmission voltage do not exceed their respective upper limit values.

2. The underwater detection device of claim 1, wherein: when the transmission power and the transmission current measured by the current transmission voltage exceed the respective upper limit values, the processing circuitry performs control to reduce the transmission voltage by a predetermined voltage and return it to the transmission voltage immediately before exceeding the upper limit value.

3. The underwater detection device of claim 2, wherein: the processing circuitry completes optimization of the transmission voltage when the condition is satisfied after performing control to reduce the transmission voltage by the predetermined voltage and return the transmission voltage to the transmission voltage immediately before exceeding the upper limit value.

4. The underwater detection device of claim 1, wherein: the predetermined voltage is a voltage having a minimum width capable of increasing or decreasing the transmission voltage.

5. The underwater detection device of claim 1, wherein: the processing circuitry repeatedly executes control to increase the transmission voltage by the predetermined voltage within a range in which the transmission power and the transmission current do not exceed the respective upper limits at a plurality of transmission frequencies used for transmitting the ultrasonic wave.

6. The underwater detection device of claim 1, wherein: the processing circuitry outputs a transmission signal for optimizing the transmission condition in one sequence for transmitting and receiving the ultrasonic waves for detection.

7. The underwater detection device of claim 6, wherein: the processing circuitry outputs a transmission signal for optimizing the transmission condition at a timing different from the transmission of the ultrasonic wave for detection.

8. An underwater detection device, comprising:
processing circuitry configured to:
supply a transmission voltage and a transmission current to an ultrasonic oscillator;
measure the transmission voltage;
measure the transmission current; and
optimize the transmission voltage as an optimization of a transmission condition of the ultrasonic oscillator by repeatedly executing control to increase the transmission voltage by a predetermined voltage from the current transmission voltage on a condition that the transmission power, calculated from the transmission voltage and the transmission current, and the transmission current, measured by the current transmission voltage under actual use conditions do not exceed their respective upper limit values.

9. The underwater detection device of claim 2, wherein: when the transmission power and the transmission current measured by the current transmission voltage exceed the respective upper limit values, the processing circuitry performs control to reduce the transmission voltage by a predetermined voltage and return it to the transmission voltage immediately before exceeding the upper limit value.

10. The underwater detection device of claim 9, wherein: the processing circuitry completes optimization of the transmission voltage when the condition is satisfied after performing control to reduce the transmission voltage by the predetermined voltage and return the transmission voltage to the transmission voltage immediately before exceeding the upper limit value.

11. An underwater detection device, comprising:

processing circuitry configured to:

supply a transmission voltage and a transmission current to an ultrasonic oscillator;

measure the transmission voltage;

measure the transmission current; and optimize a transmission frequency as an optimization of a transmission condition of the ultrasonic oscillator by acquiring the transmission voltage and the transmission current while changing the frequency of the transmission signal, calculating a value of an equivalent parallel resistance from the transmission voltage and the transmission current acquired for each of the frequencies, and acquiring the frequency at which the calculated value of the equivalent parallel resistance is minimized as an optimum value of the transmission frequency.

12. A transmission condition optimization method for automatically optimizing the transmission condition of an ultrasonic oscillator for transmitting ultrasonic waves to the water, comprising:

measuring a transmission voltage and a transmission current supplied to an ultrasonic oscillator during actual use; and optimizing the transmission voltage as an optimization of a transmission condition of the ultrasonic oscillator by repeatedly executing control to increase the transmission voltage by a predetermined voltage from the current transmission voltage on a condition that the transmission power, calculated from the transmission voltage and the transmission current, and the transmission current, measured by the current transmission voltage do not exceed their respective upper limit values.

13. A non-transitory computer-readable medium having stored thereon computer-executable instructions which, when executed by a computer, cause the computer to:

measure a transmission voltage and a transmission current supplied to an ultrasonic oscillator during actual use; and optimize the transmission voltage as an optimization of a transmission condition of the ultrasonic oscillator by repeatedly executing control to increase the transmission voltage by a predetermined voltage from the current transmission voltage on a condition that the transmission power, calculated from the transmission voltage and the transmission current, and the transmission current, measured by the current transmission voltage do not exceed their respective upper limit values.

* * * * *